US011455766B2

(12) United States Patent
Argade et al.

(10) Patent No.: US 11,455,766 B2
(45) Date of Patent: Sep. 27, 2022

(54) VARIABLE PRECISION COMPUTING SYSTEM

(71) Applicant: ADVANCED MICRO DEVICES, INC., Santa Clara, CA (US)

(72) Inventors: Pramod V. Argade, San Diego, CA (US); Daniel Nikolai Peroni, San Diego, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/134,856

(22) Filed: Sep. 18, 2018

(65) Prior Publication Data

US 2020/0090397 A1 Mar. 19, 2020

(51) Int. Cl.

| | |
|---|---|
| ***G06T 15/00*** | (2011.01) |
| ***G06T 15/80*** | (2011.01) |
| ***A63F 13/25*** | (2014.01) |
| *G09G 5/36* | (2006.01) |

(52) U.S. Cl.

CPC ............ *G06T 15/005* (2013.01); *A63F 13/25* (2014.09); *G06T 15/80* (2013.01); *A63F 2300/203* (2013.01); *G06T 2210/36* (2013.01); *G09G 5/363* (2013.01); *G09G 2330/023* (2013.01)

(58) Field of Classification Search

CPC .................................................. G06F 9/30014

See application file for complete search history.

(56) References Cited

U.S. PATENT DOCUMENTS

| | | | | |
|---|---|---|---|---|
| 8,051,123 B1 * | 11/2011 | Oberman | G06F 7/5443 | 708/501 |
| 8,190,669 B1 * | 5/2012 | Oberman | G06F 7/44 | 708/523 |
| 11,218,718 B2 * | 1/2022 | Li | H04N 19/98 | |
| 2007/0058565 A1 * | 3/2007 | Wiatrowski | H04W 28/06 | 370/252 |
| 2007/0078923 A1 * | 4/2007 | Dockser | G06F 9/30014 | 708/492 |
| 2009/0051687 A1 * | 2/2009 | Kato | G06T 11/40 | 345/426 |
| 2009/0150654 A1 * | 6/2009 | Oberman | G06F 9/30014 | 712/221 |

(Continued)

OTHER PUBLICATIONS

Angerd et al., A Framework for Automated and Controlled Floating-Point Accuracy Reduction in Graphics Applications on GPUs, 2017 (Year: 2017).*

(Continued)

*Primary Examiner* — Phong X Nguyen

(57) ABSTRACT

A processor selectively adjusts the precision of data for different functional units. Specified functional units of the processor, such as shader processing unit of a graphics processing unit (GPU) include a zeroing module to store, based on the states of corresponding precision flags, a data value of zero at specified portion of an input and/or output data operand. The functional unit then processes the data including the zeroed portion. Because a portion of the data has been zeroed, the functional unit consumes less power during data processing. Furthermore, the precision flags are set such that the reduced precision of the data does not significantly impact a user experience.

20 Claims, 5 Drawing Sheets

500

502 RECEIVE DATA FOR PROCESSING

504 PRECISION FLAG SET?

NO → 506 LEAVE DATA UNMODIFIED

YES → 508 ZERO PORTION OF DATA BASED ON FLAG

510 PROCESS DATA AT SHADER

512 CREATE AND DISPLAY FRAME BASED ON PROCESSED DATA

(56) References Cited

U.S. PATENT DOCUMENTS

2009/0265528 A1* 10/2009 Du ........................ G06F 9/3851
712/220
2011/0004644 A1* 1/2011 Henry ................. G06F 9/30014
708/231
2011/0078225 A1* 3/2011 Johnson ................ G06F 9/3013
708/495
2013/0282780 A1* 10/2013 Dubrovin ................ G06F 7/485
708/230
2014/0188968 A1* 7/2014 Kaul ....................... G06F 7/483
708/501
2015/0039661 A1* 2/2015 Blomgren ............... H03M 7/24
708/204
2015/0169289 A1* 6/2015 Tannenbaum ........ G06F 7/4876
708/503
2017/0032489 A1* 2/2017 Nystad .................. G06T 15/005
2017/0124757 A1* 5/2017 Sathe .................... G06T 15/005
2017/0358129 A1* 12/2017 Chen ................... G06F 9/30014
2018/0262205 A1* 9/2018 Li ......................... G06F 7/4833
2018/0315399 A1* 11/2018 Kaul ........................ G06N 3/08
2018/0322607 A1* 11/2018 Mellempudi ............. G06F 5/01
2018/0341489 A1* 11/2018 Shah ..................... G06F 9/3851
2018/0373535 A1* 12/2018 Zhang ................. G06F 9/30189
2019/0081637 A1* 3/2019 Pool ....................... G06N 7/005
2019/0243772 A1* 8/2019 Roberts ................. G06F 3/0619
2020/0007151 A1* 1/2020 Fenney ................ H04N 19/119
2020/0082491 A1* 3/2020 Harris ....................... G06T 1/60
2020/0169382 A1* 5/2020 Factor ................... G06F 3/0608

OTHER PUBLICATIONS

Hao et al., Variable-Precision Rendering, 2001 (Year: 2001).*

Hsiao et al., Energy-aware hybrid precision selection framework for mobile GPUs, 2013 (Year: 2013).*

Le Grand et al., SPFP: Speed without compromise—A mixed precision model for GPU accelerated molecular dynamics simulations, 2013 (Year: 2013).*

* cited by examiner

VARIABLE PRECISION COMPUTING SYSTEM

BACKGROUND

Description of the Related Art

A processor typically includes one or more functional units to support execution of program instructions, thereby allowing the processor to carry out specified operations on behalf of an electronic device. Many of these functional units support instruction execution via the arithmetic manipulation of data operands. For example, a graphics processing unit (GPU) of a processor includes multiple functional units that each perform arithmetic operations on data operands provided to or generated by the GPU, allowing the GPU to manipulate graphical or other information in order to generate frames for display. A modern processor typically supports large data operands, allowing the functional units to calculate values with a high degree of precision. However, such high precision calculations can consume relatively large amounts of power and other processor resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for selectively adjusting the precision of data for different functional units of a processor. For example, in some embodiments specified functional units of the processor, such as shader processing unit of a graphics processing unit (GPU) include a zeroing module to store, based on the states of corresponding precision flags, a data value of zero at specified portion of an input and/or output data operand. The functional unit then processes the data including the zeroed portion. Because a portion of the data has been zeroed, the functional unit consumes less power during data processing. Furthermore, in some embodiments the precision flags are set such that the reduced precision of the data does not significantly impact a user experience. Thus, the processor supports reduced power consumption without substantially impacting the user experience.

To illustrate via an example, in some embodiments a graphics processing unit (GPU) includes multiple shader processing units to process graphical data in order to generate a frame for display at an electronic device. For example, shaders programs are executed on the shader processor of a GPU to render a scene in a 3D game. There are different types of shaders such as, for example, a vertex shader, pixel shader, and the like. In some cases, because of the limitations of the human eye, processing the data at full precision (e.g., using all 64 bits of data in a 64-bit processor) for a particular shader does not enhance the visual appearance to a user of the generated frame. However, for another shader of the GPU processing the data at full precision results in a more visually pleasing frame. Accordingly, in some embodiments a processor individually sets precision flags for each shader running on the GPU based on whether the corresponding shader is expected to require full precision data in order to visually enhance the frame. In response to receiving data for processing, a shader having a set precision flag zeroes a portion of the data and processes the data including the zeroed portion. Power consumption at the GPU is thereby reduced without significantly impacting the visual quality of the frames generated by the GPU for display.

FIGS. 1-5 are described below with respect to an example implementation of the techniques described herein at GPU, and in particular at a set of GPU shaders, of a processor. In other embodiments the techniques described herein are implemented at other functional units of a processor, such as at a plurality of execution units of a central processing unit (CPU) core of a processor.

Figure 1:
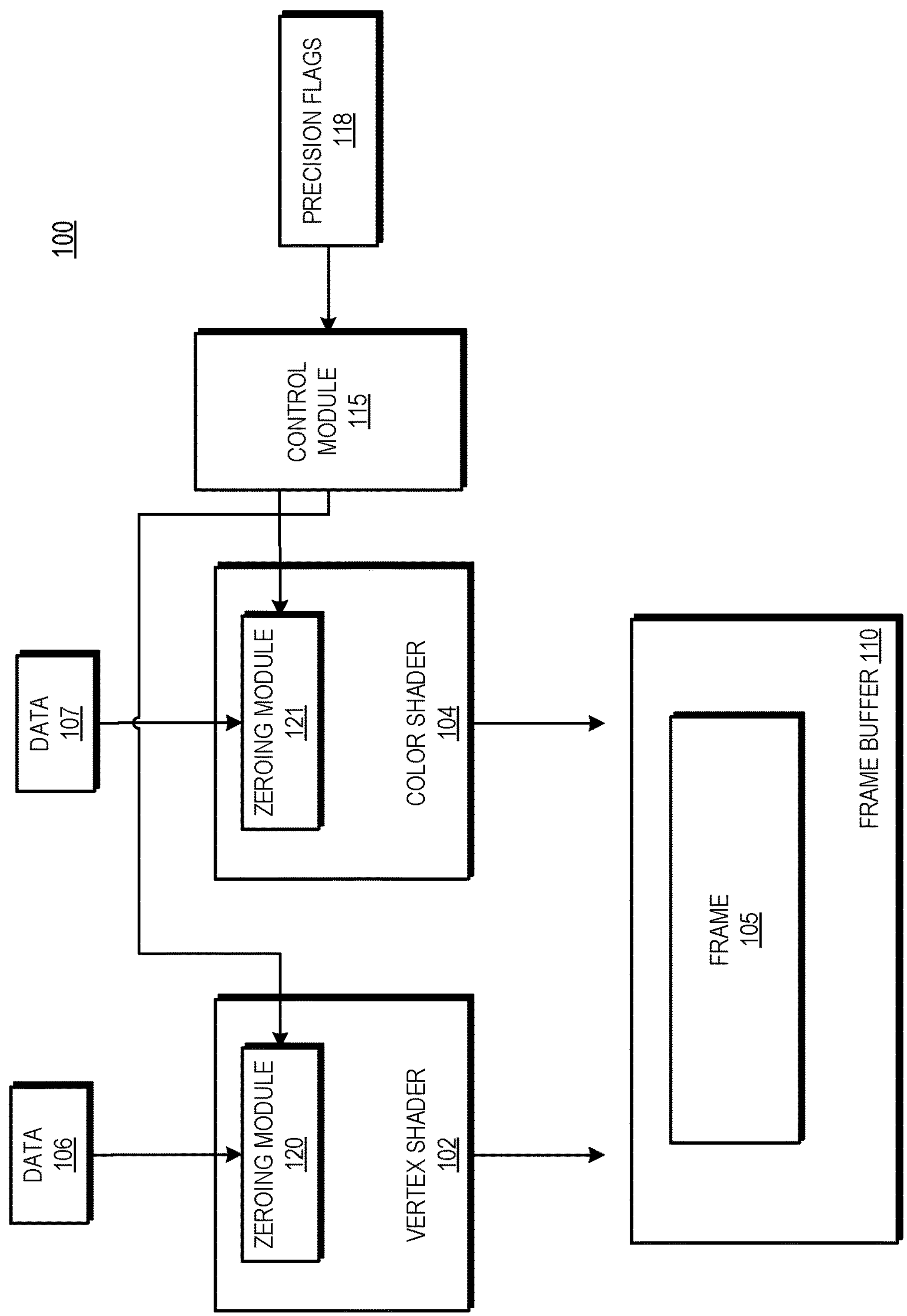
FIG. 1 is a block diagram of a graphics processing unit (GPU) that supports variable precision data in accordance with some embodiments.

FIG. 1 illustrates a block diagram of a GPU 100 of a processor. In some embodiments, the processor including the GPU 100 is generally configured to execute sets of instructions of a set of shaders (e.g. computer programs) in order to carry out specified tasks on behalf of an electronic device. Accordingly, in different embodiments the processor (and therefore the GPU 100) is part of an electronic device such as a desktop computer, laptop computer, tablet, smartphone, game console, and the like. Further, in some embodiments the processor includes additional modules not illustrated at FIG. 1 to support execution of instructions, such as one or more CPU cores, one or more caches, one or more memory controllers, and the like.

The GPU 100 is generally configured to execute graphical operations on behalf of the processor to generate frames (e.g., frame 105) for storage at a frame buffer 110. In some embodiments, the GPU 100 renders the frames stored at the frame buffer 110 and the rendered frames are displayed at a display device (not shown) of an electronic device. To support generation of the frames for display, the GPU includes a plurality of shader processors (e.g. shaders 102 and 104), wherein each shader includes hardware configured to perform a corresponding set of operations on received data (e.g. pixel data). In particular, each set of operations corresponds to a particular aspect of the frame for display. Thus, for example, the shader 102 is a vertex shader that handles the processing of vertices for the generated frames, while the shader 104 is a color shader that processes color information for the frames.

It will be appreciated that in some embodiments the GPU 100 includes shader processors in addition to those illustrated at FIG. 1. Further, it will be appreciated that although the shaders 102 and 104 are illustrated as separate modules in FIG. 1, in some embodiments the shaders 102 and 104 are functional units managed by software and that share one or more hardware modules of the GPU 100. Thus, for example, in some embodiments the shaders 102 and 104 each use at least some of the same arithmetic logic units (ALUs), registers, buffers, and the like. Moreover, while the shaders 102 and 104 are illustrated at FIG. 1 in parallel, in some embodiments at least a subset of the shader processors of the GPU 100 generate frames for display in a pipelined fashion.

To perform its operations, each of the shaders performs arithmetic operations on received data (e.g., data 106, and 107, respectively). For example, in some embodiments each of the shaders 102 and 104 includes or employs at least one arithmetic logic unit (ALU), such as a floating point multiply accumulator (FMAC) unit, to perform floating point operations on data operands. The manipulation of data, in particular of bits that change values between zero and one for subsequent instructions, the arithmetic logic units consumes power at the GPU 100, because of the storage and other processing of these bits requires flip-flops and other logic elements of the units. Further, as explained above processing a data operand at full precision—that is, using all of the bits of the data operand—for some shaders does not significantly improve the quality of the generated frame. Accordingly, to reduce power consumption while maintaining visual quality of the generated frames, each of the shaders 102 and 104 includes a zeroing module, designated zeroing modules 120 and 121, respectively.

Each of the zeroing modules 120 and 121 is generally configured to receive control information, as described further below, and based on the received control information to zero a corresponding portion of data operands employed by the corresponding shader. As used herein, zeroing refers to storing zeros at a register or other storage module to replace a portion of data with the value zero. Thus, if the data 106 has a value of 10110110, and the control information received by the zeroing module indicates that 4 bits of the data are to be zeroed, in response the zeroing module stores bit values of zero in the 4 least significant bits of a register storing the data 106, thereby generating the modified data value of 10110000. The shader 102 uses the modified data value in its processing operations to generate at least a portion of the pixel data that forms the frame 105.

In at least some embodiment, the zeroing modules 120 and 121 are configured to zero only a subset of the components of each data value used by arithmetic logic units of the shaders 102 and 104. For example, in some embodiments the shaders 102 and 104 include floating point arithmetic logic units that perform floating point operations on data operands wherein each data operand includes a sign component, a mantissa component, and an exponent component, and the zeroing modules 120 and 121 are each configured to zero a portion of the mantissa component of each data operand, without modifying either of the sign component and the exponent component.

To control operation of the zeroing modules 120 and 121, the GPU 100 includes a plurality of precision flags 118 and a control module 115. The precision flags 118 indicate, for each zeroing module at a shader of the GPU 100, whether any portion of the data processed by the shader is to be zeroed, and if so, the size of the portion to be zeroed by the corresponding zeroing module. In operation, the control module 115 accesses the precision flags 118 and, based on the state of each flag, sends control information to the corresponding zeroing module to zero data for processing at the corresponding shader, as indicated by the precision flags associated with that shader.

In different embodiments, and as described further herein, the GPU 100 sets the precision flags 118 based on any of a variety of criteria, such as one or more of an indication from a compiler of a requested precision by a programmer, a power control policy set by a user or other entity, a type of program for which the GPU 100 is generating frames, and the like, or any combination thereof. Further, in some embodiments the GPU 100 updates or modifies the precision flags 118 over time in response to changing conditions at the processor that includes the GPU 100. For example, in some embodiments the GPU 100 updates the precision flags 118 each time execution of a program is initiated at the processor, so that the precision flags 118 reflect the program currently being executed at the processor. In response to the precision flags 118 being updated or modified, the control module 115 changes the control information provided to the zeroing modules 120 and 121 accordingly.

In some embodiments, the precision flags 118 are set to configure each zeroing module individually, such that some zeroing modules are set to zero a portion of data operands while other zeroing modules are set to maintain data operands in their original state. The precision flags 118 are thus be used to set the precision of data processed by each shader individually according to, for example, the configuration of the processor and the program being executed. An example is illustrated at FIG. 2 in accordance with some embodiments.

Figure 2:
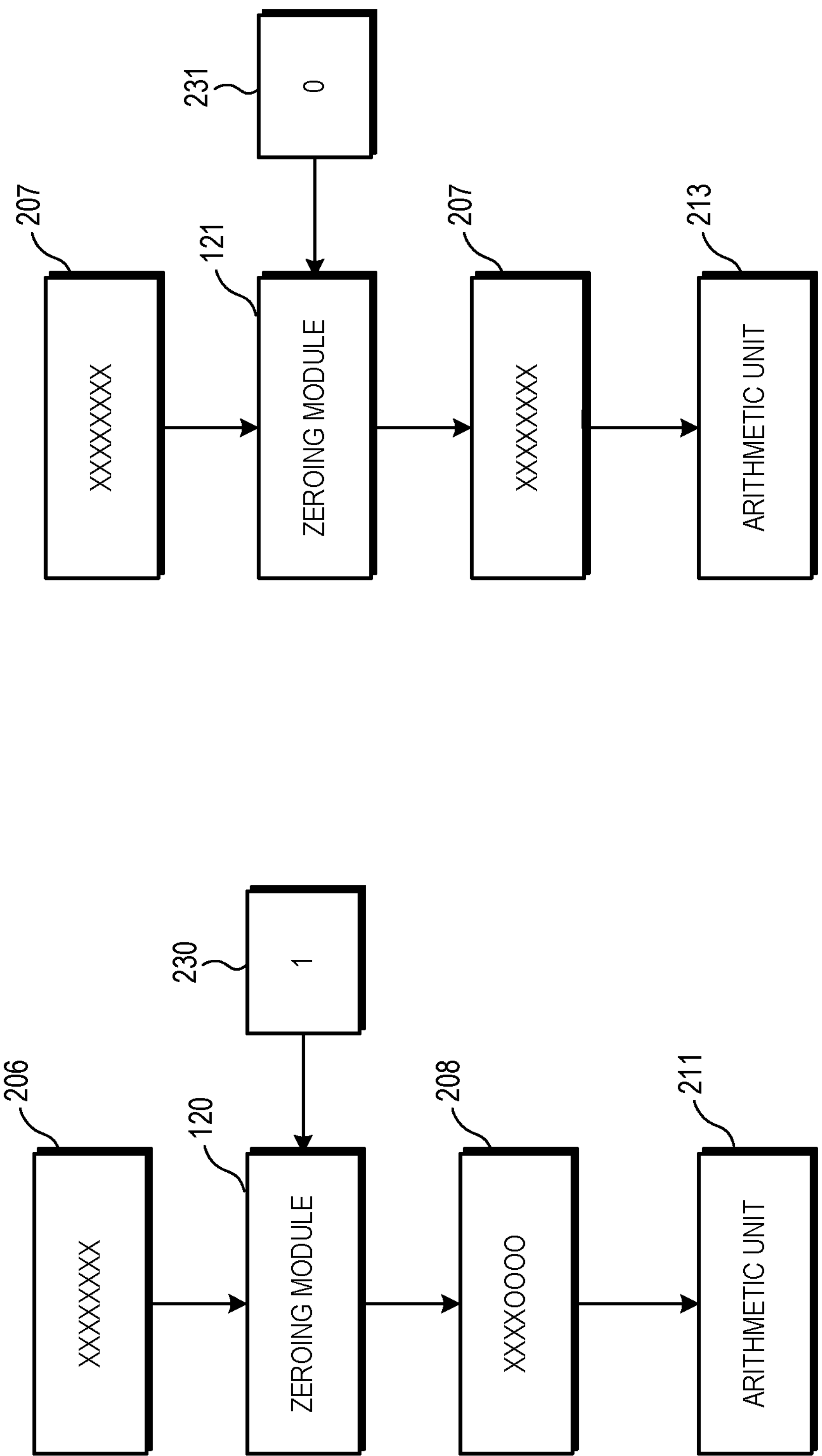
FIG. 2 is a block diagram illustrating an example of the GPU of FIG. 1 changing the precision of a data operand based on the state of a precision flag in accordance with some embodiments.

FIG. 2 illustrates precision flags 230 and 231, which control the operation of the zeroing modules 120 and 121 respectively. The precision flag 230 is in a set state, indicating that the zeroing module is to zero the four least significant bits of data processed at the shader 102. For example, in some embodiments, a game vendor profiles the game to determine effect of individual shader precision on the picture quality of the frames and specify precision for a list of shaders. A driver program at run time detects that a particular game is about to be executed on the GPU and arranges to set the precision flags specified by the game vendor in 118. Accordingly, in response to the shader 102 receiving data 206 for processing, the zeroing module 120 zeros the four least significant bits of the data 206, resulting in modified data 208. The shader 102 uses the modified data 208 for processing, including performing designated calculations at an arithmetic unit 211.

The precision flag 231 is in a negated state, indicating that the zeroing module 121 is to maintain data processed at the shader 102 at full precision (that is, no bits of data are to be zeroed). Accordingly, in response to the shader 104 receiving data 207 for processing, the zeroing module 121 maintains the data 207 in its original, full precision state. The shader 104 uses the data 207 for processing, including performing designated calculations at an arithmetic unit 213. It will be appreciated that, in some embodiments, the data 206 and the data 207 are both associated with generation of the frame 105. That is, the precision flags 230 and 231 are set differently for the same frame, and the shaders 102 and 104 therefore use different precision data for generating the same frame. Thus, by supporting individual precision flags for each shader, the GPU 100 provides for reduced power consumption while maintaining quality of the generated frames.

Figure 3:
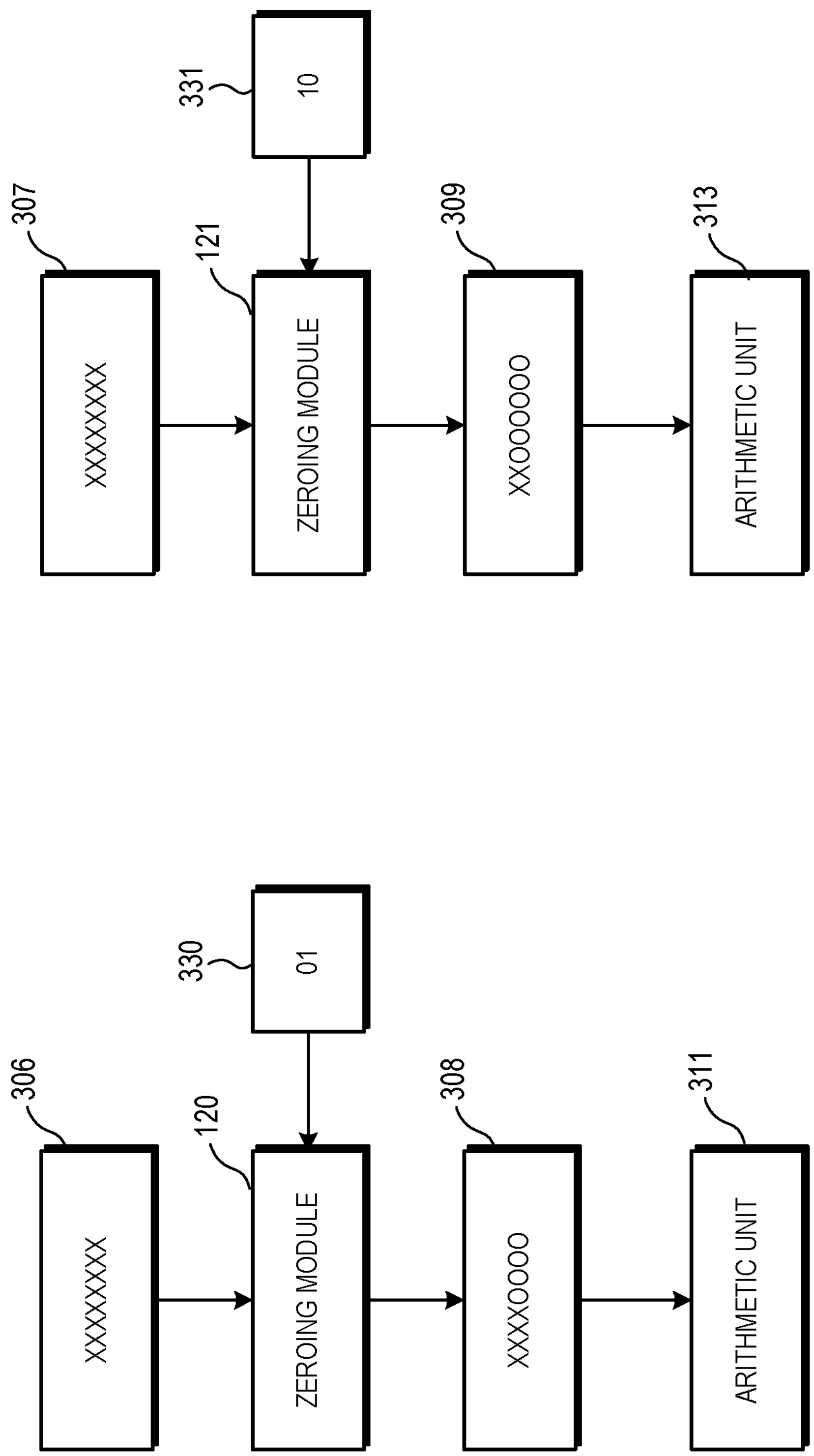
FIG. 3 is a block diagram illustrating an example of the GPU of FIG. 1 changing the precision of multiple data operands based on the states of corresponding precision flags in accordance with some embodiments.

In some embodiments, the precision flags 118 are set such that some zeroing modules are set to zero a portion first number bits of the corresponding data operands, while other zeroing modules are set to zero a portion of a second, different number of bits. An example is illustrated at FIG. 3 in accordance with some embodiments. FIG. 3 illustrates precision flags 330 and 331, which control the operation of the zeroing modules 120 and 121 respectively. The precision flag 330 has a value of 10, indicating that the zeroing module is to zero the four least significant bits of data processed at the shader 102. Accordingly, in response to the shader 102 receiving data 306 for processing, the zeroing module 120 zeros the four least significant bits of the data 306, resulting in modified data 308. The shader 102 uses the modified data 208 for processing, including performing designated calculations at an arithmetic unit 311.

The precision flag 331 has a value of 10, indicating that the zeroing module 121 is to zero the six least significant bits of received data. Accordingly, in response to the shader 104 receiving data 307 for processing, the zeroing module 121 zeroes the six least significant bits to generate modified data 309. The shader 104 uses the modified data 309 for processing, including performing designated calculations at an arithmetic unit 313. It will be appreciated that, in some embodiments, the data 306 and the data 307 are both associated with generation of the frame 105.

Figure 4:
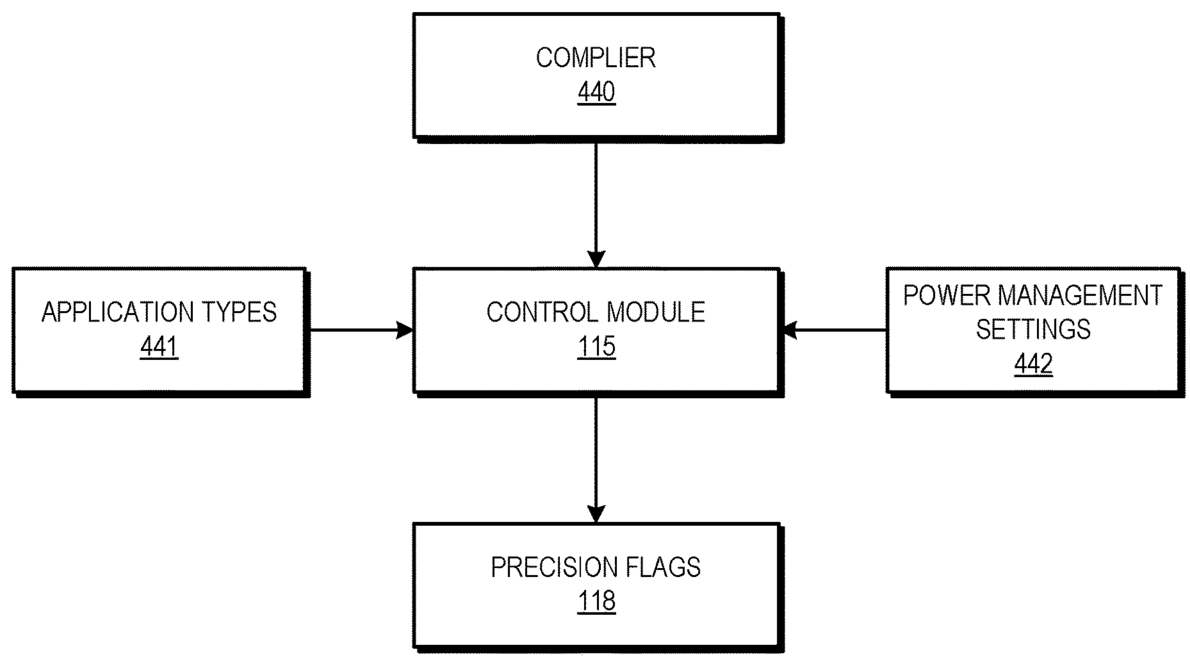
FIG. 4 is a block diagram illustrating a control module of the GPU of FIG. 1 setting the state of precision flags in accordance with some embodiments.

As noted above, in some embodiments the precision flags 118 are set by the GPU 100 based on any of a variety of factors. An example is illustrated at FIG. 4 in accordance with some embodiments, wherein the control module 115 sets the state of the precision flags based on information from a compiler 440, based on a set of application types 441, and based on power management settings 442. The information provided by the compiler 440 represents hints provided by a programmer of an application to be executed at the processor, analysis of the application by the compiler 440, or a combination thereof. For example, in some embodiments a programmer places specifies in the code of the application to indicate that a portion of an application thereof (e.g., a shader subroutine) are to be executed at a lower precision than other portions of the program. In response, the control module 115 sets the precision flag for the corresponding portion of the application (e.g., the corresponding shader), thereby reducing the precision of data used by that application portion. In some embodiments, instead of or in addition to explicit hints in the code, the compiler 440 is configured to analyze an application during compilation and, based on specified patterns or indicators, to indicate to the control module 115 portions of an application that are to be executed at lower precision. Based on these indications, the control module 115 sets the state of corresponding ones of the precision flags 118 to change the precision for corresponding portions of the application being executed.

The application types 441 indicate, for specified program types, the shaders or other modules that are to be executed at a lower precision. To illustrate via an example, in some embodiments the applications types 441 indicates that applications having a "game" type (that is, game applications) are to be executed at full precision for all shaders, while applications have a "productivity" type (e.g. word processors and spreadsheets) are to be executed with a specified subset of shaders at reduced precision. In different embodiments, the precision of each shader for a given application type, as stored at the application types 441, is set by a user, is determined during a characterization of the application, or a combination thereof. During operation, in response to execution of an application being initiated at the processor, the control module 115 identifies a type of the application being executed based, for example, on an identifier provided by the application. The control module 115 employs the application types 441 to determine the precision for each shader for the identified application type and sets the precision flags 118 according to the identified precisions.

The power management settings 442 is a set of stored values indicating a power management policy to be implemented at the GPU 100. Thus, for example, in some embodiments the power management settings 442 indicate that the GPU 100 is to execute in a high-performance, high power mode, and in other embodiments the power management settings indicate that the GPU 100 is to execute in a low performance, power savings mode. In some embodiments, the power management settings 442 change over time based on user input, based on changing conditions at an electronic device, or a combination thereof. For example, in some embodiments where the GPU 100 is incorporated in a device that is configured to intermittently operate on battery power (e.g., a laptop), the power management settings 442 indicate the high-performance mode when the device is coupled to a persistent power source (e.g., a wall outlet) and indicates the low performance mode when the device is operating on battery power. In some embodiments the resolution of the display device may be input to the control module 115 which would then determine the level of approximation to apply.

Based on the power management settings 442, the control module 115 sets the state of precision flags 118. For example, in some embodiments, when the power management settings 442 indicate the high-performance mode the control module 115 sets the precision flags 118 so that all shaders of the GPU 100 execute at full precision (that is, all shaders use full precision data and do not zero any portion of the data operands). When the power management settings 442 indicate the low performance mode, the control module 115 sets the precision flags 118 so that a subset of the shaders of the GPU 100 operate at lower precision by employing their zeroing modules to zero a specified portion of their data operands.

Figure 5:
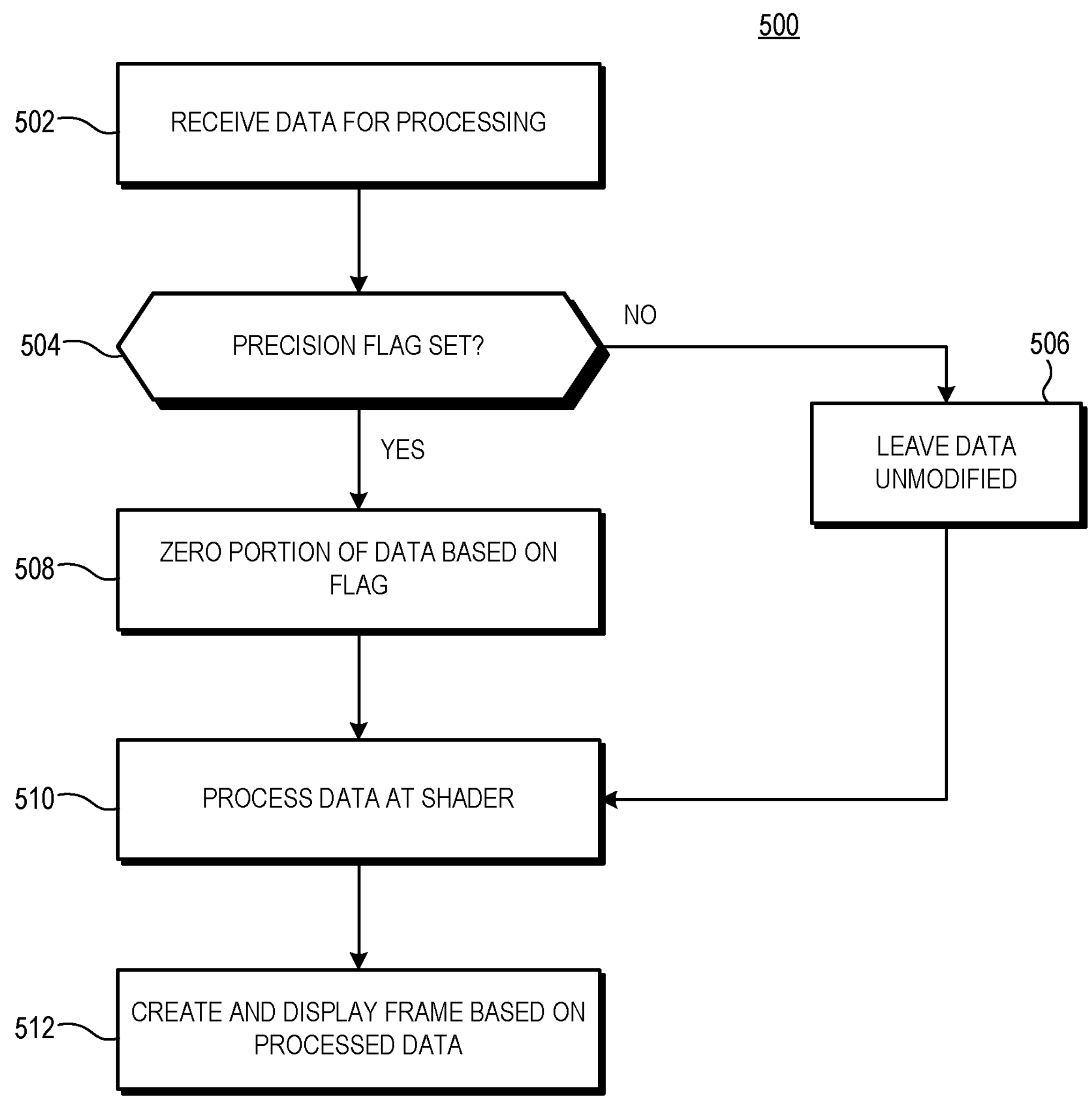
FIG. 5 is a flow diagram of a method of changing the precision of data for processing at functional units of a processor based on the states of corresponding precision flags in accordance with some embodiments.

FIG. 5 is a flow diagram of a method 500 of changing the precision of data for processing at functional units of a processor based on the states of corresponding precision flags in accordance with some embodiments. For purposes of description, the method 500 is described with respect to an example implementation at the GPU 100 of FIG. 1. At block 502, the shader 102 receives data for processing. At block 504, the control module 115 determines if one of the precision flags 118 corresponding to the shader 102 are in a set state. If not, the method flow moves to block 506 and the zeroing module 120 leaves the received data unmodified. The method flow proceeds to block 510 and the shader 102 processes the unmodified data. The method flow moves to block 512 and the GPU 100 generates a frame for display based on the data processed by the shader 102 and displays the generated frame.

Returning to block 504, in response to at least one of the precision flags 118 corresponding to the shader 102 are in a set state, the method flow moves to block 508 and the zeroing module 120 zeroes a portion of the received data, wherein the size of the zeroed portion is based on which of the precision flags 118 are set. The method flow proceeds to block 510 and the shader 102 processes the modified data. The method flow moves to block 512 and the GPU 100 generates a frame for display based on the data processed by the shader 102 and displays the generated frame. In some embodiments, data input to the shader may be first processed by another specialized hardware in the GPU before that data is further process by the shader processing unit. An example is texture filtering, which may be implemented in a separate hardware. The precision flags 118 may be passed to such texture filtering hardware to control the precision of the arithmetic computation in that unit for the data received from the said shader.

The method 500 is employed in any of a variety of devices and for a variety of applications. For example, in some embodiments a game application includes a plurality of shaders. A game vendor uses an automated mechanism to vary precision of one or more shaders to determine its impact on the overall image quality quantitively using a quantitative image quality measure such as Peak Signal to Noise Ratio (PSNR). Such an automated mechanism identifies the shaders that are executed at reduced precision at run time. The list of shaders is provided along with the game shader code and associated data to the end user. A driver program running on a CPU coordinates running a game application on GPU. In some embodiments the driver program accesses the end user game package and arrange to set the precision flags.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

in response to receiving first data at a first shader of a graphics processing unit (GPU) for processing, identifying a state of a first flag associated with the first shader, the first flag indicating reduced precision calculation;

in response to identifying that the state of the first flag is a first state:

zeroing a first portion of the first data by replacing the first portion of the first data with zeros to generate first modified data, a size of the first portion based on the first state associated with the first shader; and performing operations at the first shader based on the first modified data.

2. The method of claim 1, wherein:

zeroing the first portion of the first data comprises zeroing a portion of a mantissa of the first data.

3. The method of claim 1, further comprising:

in response to identifying that the state of the first flag is a second state, zeroing a second portion of the first data to generate second modified data.

4. The method of claim 1, further comprising:

in response to receiving second data at a second shader of the GPU for processing, identifying a state of a second flag associated with reduced precision calculation;

in response to identifying that the state of the second flag is the first state:

zeroing a first portion of the second data to generate second modified data; and performing shading operations at the second shader based on the second modified data.

5. The method of claim 4, further comprising:

in response to identifying that the state of the second flag is a second state, zeroing a second portion of the second data, the second portion of the second data larger than the first portion of the first data.

6. The method of claim 4, further comprising:

in response to identifying that the state of the second flag is a second state, performing shading operations at the second shader using the second data.

7. The method of claim 6, wherein the first data and the second data are both associated with a same frame to be generated by the GPU.

8. The method of claim 1, further comprising:

identifying a type of program executing at a processor including the GPU; and setting the first flag based on the identified type of program.

9. The method of claim 1, further comprising:

setting the first flag based on a compiler flag included at a first program.

10. A method, comprising:

determining, for each of a plurality of functional units of a processor, a state of a corresponding flag associated with reduced precision calculation;

based on the state of the flags, zeroing a portion of first data for processing at a first subset of the plurality of functional units by replacing the portion of the first data with zeros to generated modified first data, a size of the portion based on the state; and processing the modified first data at the first subset of the plurality of functional units.

11. The method of claim 10, further comprising:
based on the state of the flags, processing data in an unmodified state at a second subset of the plurality of functional units.

12. A graphics processing unit (GPU) comprising:
a control module configured to, in response to receiving first data, identify a state of a first flag associated with reduced precision calculation;
a first shader configured to, in response to the control module identifying that the state of the first flag is a first state:
zero a first portion of the first data by replacing the first portion of the first data with zeros to generate first modified data, a size of the first portion based on the first state; and
perform shading operations at the first shader based on the first modified data.

13. The GPU of claim 12, wherein:
zeroing the first portion of the first data comprises zeroing a portion of a mantissa of the first data.

14. The GPU of claim 12, wherein the first shader is configured to:
in response to the control module identifying that the state of the first flag is a second state, zero a second portion of the first data to generate second modified data.

15. The GPU of claim 12, further comprising:
a second shader;
wherein:
the control module is to, in response to receiving second data for processing, identify a state of a second flag associated with reduced precision calculation; and
the second shader is configured to, in response to identifying that the state of the second flag is the first state:
zero a first portion of the second data to generate second modified data; and
perform operations at the second shader based on the second modified data.

16. The GPU of claim 15, wherein the second shader is configured to:
in response to identifying that the state of the second flag is a second state, zero a second portion of the second data, the second portion of the second data larger than the first portion of the first data.

17. The GPU of claim 15, wherein the second shader is configured to, in response to identifying that the state of the second flag is a second state, perform shading operations at the second shader using the second data.

18. The GPU of claim 12, wherein the control module is to:
provide the first flag to an arithmetic unit associated with shader computation.

19. The GPU of claim 12, wherein the control module is to:
receive a list of shaders indicated as reduced precision shaders based on an image quality measure.

20. The GPU of claim 19, wherein the control module is to:
set the first flag based on a device driver accessing the list of shaders.

* * * * *